Patented June 21, 1927.

1,633,200

UNITED STATES PATENT OFFICE.

JOR MORTEN AUGUST STILLESEN, OF NIAGARA FALLS, NEW YORK.

TREATMENT OF LIME NITROGEN.

No Drawing. Application filed August 8, 1919, Serial No. 316,038. Renewed November 9, 1926.

This invention relates to the treatment of lime nitrogen, and has especial reference to improvements whereby the percentage of ammonia can be increased, or conversion of cyanamide into urea cheaply effected.

The products of this invention will be useful for fertilizers, for production of ammonia or ammonia salts for technical uses. In connection with compounded fertilizers, it is desirable to have a product which will not revert available phosphates when mixed therewith; which will have a controllable percentage of carbonates of calcium, both hydrated and unhydrated, normal and basic; and which can be used as a top dressing on soil or plants, as distinguished from raw lime nitrogen, which cannot be compounded with available phosphates, which is dusting, and which has to be applied and plowed under some time before planting in order to be decomposed by the soil bacteria present in humus into available forms of nitrogen. The products of this invention obtain the above novel and desirable results by means of a novel process.

I have found that calcium cyanamid in raw lime nitrogen can be converted into urea by treating with water and carbon dioxide, the heat evolved by the reaction of the calcium oxide in the raw lime nitrogen with carbon dioxide being sufficient to produce steam or to vaporize the water, and this with additional carbon dioxide decomposes the cyanamid to produce urea. If it is preferred to use sufficient water to convert the nitrogen into ammonia, about 1.6 of water to each part of ammonia, then put the wet lime nitrogen into a closed vessel connected to a source of carbon dioxide, preferably under expansion, as from solid or liquid to gas. The carbon dioxide reacting with the wet calcium oxide evolves heat sufficient to free ammonia, which in the nascent state combines with the carbon dioxide to form urea. The heat necessary for the liberation of ammonia may be supplied in other ways than by the action of water on calcium oxid, and by supplying the proper amount of heat such liberation of ammonia will take place in the pure calcium cyanamid as well as in lime nitrogen containing the same.

The reactions are:

(1) $CaCN_2 + 3H_2O + heat = CaCO_3 + 2NH_3$
(2) $2NH_3 + CO_2 = CO(NH_2)_2 + H_2O$ so that in adding water, less than the theoretical amount may be used, as the water set free by this reaction will be utilized, thus making the reaction progressive. If dicyandiamid is present, it is also converted into urea, according to the reactions:

(3) $C_2H_4N_4 + 4H_2O = 4NH_3 + 2CO_2$
(4) $4NH_3 + 2CO_2 = 2CO(NH_2)_2 + 2H_2O$.

In dealing with dicyandiamid, only about half of the theoretical water need be added, since the other half is supplied in the formation of urea by equation (4), similarly to equation (2) where urea is formed. The heat evolved by these reactions can be regulated by the amount of expanding carbon dioxide supplied, so that there will be no decomposition of the end product.

In order to reduce the percentage of calcium carbonate in a fertilizer material, lime nitrogen is treated with hot water to convert the cyanamid into dicyandiamid, and the solution of the latter decanted off and concentrated to leave about the amount of water necessary for formation of ammonia, then treated as before in the presence of calcium oxide. This solution, or wet or dry dicyandiamid can be mixed with raw lime nitrogen of such quantity as to produce the desired heat and percentage of lime carbonate in the end product, and then treated as before with carbon dioxide. Instead of using lime nitrogen for mixing with the wet dicyandiamid, calcium oxide can be used, and then treated with expanding carbon dioxide, at or below 60° C., to form normal and basic carbonates with evolution of heat. Such a product can have as low as one part of nitrogen to 0.61 part of calcium, instead of one part of nitrogen to 2.48 parts of calcium as in commercial calcium cyanamid, of which latter not over 60 pounds can be used to a ton of mixed fertilizer, because the high percentage of calcium salts, such as oxide or hydrate, reverts soluble phosphoric acid to insoluble. In other words about four times as much nitrogen can be used in mixed fertilizer by using my product.

The temperature for the formation of urea is around 135° C.

If no calcium is wanted in the final product, dicyandiamid with sufficient water for the conversion of its nitrogen into ammonia is placed in a closed tube and heated to about 135° C. or higher in contact with the necessary amount of carbon dioxide, either gas, liquid or solid, giving urea or derivatives, or other nitrogenous compounds, and constituting a concentrated and efficient nitrogenous fertilizer material.

When raw lime nitrogen is used as a fertilizer, a toxic action has been observed which by some authorities is considered to be due to the presence of CaC, but this compound, if present, is decomposed by the treatment herein described and its toxic effect, if any, eliminated.

I have further found that dicyandiamid, with or without being mixed with cyanamid, can be mixed with superphosphate, or dicalcium phosphate, or both, and treated with water, carbon dioxide, and heat to form ammonium phosphate $(NH_4)_3 PO_4$, or the urea formed may combine with phosphoric acid to give urea phosphate, $CO (NH_2)_2 . H_3PO_4$. Also, rock phosphate can be used. In either case the calcium appears as carbonate, whether normal or basic, hydrated or unhydrated, depending on the conditions present.

It will be observed that according to equations 3 and 4, no additional carbon dioxid is required for converting the dicyandiamid molecule into the urea molecule, and when the reaction takes place in the absence of lime nitrogen, or of calcium oxid, the addition of carbon dioxid is unnecessary.

While I intend to obtain urea as the principal end product of this invention, other derivatives of dicyandiamid and of urea may be present, of which a number are known.

What is claimed, is:

1. The process which consists in treating calcium cyanamid with water and with expanding carbon dioxide at a temperature of about 135° C.

2. The process comprising treating calcium cyanamid with water to form dicyandiamid, separating the latter, and treating it in the presence of water and heat with carbon dioxide to form urea.

3. The process which consists in treating calcium cyanamid with hot water to produce a dicyandiamid solution, separating and concentrating said solution, adding raw lime nitrogen, and treating with carbon dioxid.

4. The process comprising treating dicyandiamid with water, carbon dioxide, and heat to form urea.

5. The process comprising treating calcium oxide and dicyandiamid with water and carbon dioxide gas.

6. The process which consists in treating calcium cyanamid with hot water to produce a dicyandiamid solution, separating and concentrating said solution, adding calcium oxid, and treating with carbon dioxid.

Signed at New York city, in the county of New York and State of New York this 7th day of August, A. D. 1919.

JOB MORTEN AUGUST STILLESEN.